Patented Apr. 12, 1949

2,467,177

UNITED STATES PATENT OFFICE 2,467,177

HEAT EXCHANGE MEDIA

John C. Zimmer, Union, N. J., assignor to Standard Oil Development Company, a corporation of Delaware No Drawing. Application December 30, 1944, Serial No. 570,775

13 Claims. (Cl. 252—75)

This invention relates to aqueous compositions adapted for use in circulating systems to effect heat or pressure transfer under conditions where one or more of the components may be partially volatized or subject to ebullition, and particularly to such type compositions which are substantially non-foaming. The present application is a continuation-in-part of application Serial No. 513,477, filed December 8, 1943, now abandoned.

It was disclosed in application Serial No. 513,477 that the addition of certain insoluble or substantially insoluble metallo-organic compounds to spumiferous liquid compositions containing water or alcohols, glycols, glycerols, etc., reduces the tendency of such compositions to form foam when subjected to reduced pressure or heat treatment. The particular metallo-organic compounds disclosed were the alkyl, aryl, cyclic, oxyalkyl, oxyaryl; halogenated alkyl, aryl, oxyalkyl and oxyaryl derivatives of such metals as silicon, titanium, germanium and zirconium and polymers thereof having from 2 to 50 metalloid or metal atoms in the molecule.

The desired compounds disclosed were stated as having an empirical formula:

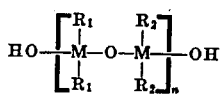

wherein $R_1$ and $R_2$ represent hydrocarbon, halogenated hydrocarbon, oxyhydrocarbon radicals; or hydrocarbon radicals containing nitrogen, phosphorus, sulfur and related elements: M represents an element such as silicon, titanium, germanium or zirconium and $n$ is a number from 1 to 25 inclusive. The OH radicals in the formula may remain as such or be substituted as commonly occurs in characteristic reactions.

Where $R_1$ and $R_2$ in the foregoing general formula are aromatic hydrocarbon groupings, intra-substituents may also occur. Such intra-substituents may be a halogen; a nitrogen-containing radical such as $NO_3$, $NH_2$, etc., a sulfur-containing radical such as SH or $SO_3H$, or a phosphorus-containing radical such as phosphate, phosphite, thiophosphate or thiophosphite. These substituents may be present as substituent radicals on the aromatic nucleus before or after a polymer formation. Similarly, in the general formula, in which $R_1$ and $R_2$ are aliphatic hydrocarbon radicals, intra-substituents of the radical may occur before and after the formation of a complex polymer.

In the case of the silicon compounds, they are generally known as "silicone oils." These silicon compounds can be made by a variety of methods, and very conveniently by reacting a Grignard reagent with a halide of the metal and hydrolyzing the resulting reaction product, and then condensing with the elimination of water. Other methods are known, some of which are described in U. S. Patents 2,258,218; 2,258,219; 2,258,220; 2,258,221; and 2,258,222. Derivatives characteristic of the hydroxyl functional group may also be prepared by reaction of the terminal hydroxyl groups of one or more of the silicone molecules. In addition to the "silicones" other organic compounds of silicon such as the silicanes and insoluble or partially insoluble silicate esters, as well as the corresponding organic compounds of titanium, germanium, and zirconium, may be used for the processes of the present invention.

Representative examples of the metallo-organic compounds disclosed in application Serial No. 513,477 are dimethyl silicone, methyl phenyl silicone, ethyl butyl silicone, chloro butyl silicone, germanium phenyl polymers; methyl cyclohexyl silicone, dicyclohexyl silicone, diphenyl silicone, hydroxy phenyl methyl silicone, phenyl ethyl silicone, phenyl propyl silicone, phenyl isopropyl silicone, tolyl butyl silicone, tolyl amyl silicone, xylyl isopropyl silicone, xylyl methyl silicone, phenyl hydroxy ethyl silicone, xylyl hydroxy propyl silicone, tolyl hydroxy propyl silicone, hydroxy phenyl hexyl silicone, phenyl stearyl silicone, and phenyl oleyl silicone, trichlorphenyl silicone, fluoro phenyl silicone, chloronaphthyl silicones, polyalkyl, polyaryl titanium derivatives.

The metallo-organic compounds disclosed in my parent application are, in general, inert, colorless, odorless and oily liquids possessing an unusually low rate of change of viscosity with temperature. The compounds remain permanent liquids over a wide range of temperatures, they are resistant to oxidation, and they are characterized by very low surface tensions. A representative compound of the class has a freezing point of $-40°$ C., specific gravity at 30° C. of 0.9634; refractive index at 30° C. of 1.4013, and a surface tension of 22.7 dynes per square centimeter. The compounds are substantially non-volatile at ordinary temperatures but show appreciable vapor pressure at temperatures above their "flash points." The "flash points" (Cleveland open cup) range from not less than 450° F. to 600° F., depending upon their viscosity. The so-called "flash points" are not true flash points but the temperatures of incipient decomposition.

Other properties of these metallo-organic compounds are that they are completely soluble in low boiling aromatic hydrocarbons and chlorinated hydrocarbons. The compounds are, therefore, not effective as foam suppressors in these liquids. They are, however, substantially insoluble in water, alcohols, esters, glycols, alkyl or cyclic hydrocarbons and particularly petroleum lubricating oil, fats, soaps, etc., and thus may be employed as foam suppressors in these media or mixtures of these media.

It was disclosed in our parent application that the metallo-organic compounds could be placed in the reactor by any convenient method or added to the spumiferous composition undergoing treatment normally productive of foam development either before or after the composition has been charged to the processing equipment, in an amount in the case of dehydration equivalent to from 1 to 100 grams per thousand square inches of evaporating surface. Since many evaporation vessels have or provide irregular evaporating surfaces, the amount of metallo-organic compound added in a dehydration process to the spumiferous composition can be calculated on the basis of weight per cent of the charge to the evaporator. Expressed in this manner, it usually only requires from $1/1,000,000$ to several per cent by weight, (based on the total charge), preferably from 0.000001-1%, to suppress frothing or the formation of persistent foams during subsequent evaporation, and the dehydration can be conducted rapidly without danger of overflowing the vessel or the occurrence of throwover through a condenser. The processes can be run either by a batch method or continuously.

It is believed that the metallo-organic compounds either are dispersed as minute particles throughout the body of the liquid which usually is not evident as a haze or cloud, under ordinary examination although the discrete particles of the froth-suppressing compound may be evident under dark field microscopic examination or that they form an extremely thin layer on the surface of the material being evaporated which operates to break up the bubbles of steam or water vapor as the bubbles reach the surface layer. It is also believed that those metallo-organic compounds, even though they may be heavier than either oil or water, can concentrate on the upper surface of the liquid because of their surface tension characteristics. Further, it appears that they also tend to disperse themselves throughout the liquid as minute droplets which act to destroy froth bubbles throughout the body of the liquid.

One possible explanation for the foam-breaking phenomenon of the metallo-organic compounds is that when a bubble comes in contact with a layer or particle of the insoluble metallo-organic compound, the liquid forming the bubble envelope is repelled by the metallo-organic compound or is displaced because of surface tension effects, thus forming a thin spot in the bubble envelope which then ruptures at this point, allowing the vapor to escape. No limitation, however, is considered with regard to the invention as a result of any such theory as to the foam suppressing action of these metallo-organic compounds.

Foaming is also a problem when many anti-freeze compositions are employed in the radiator or cooling systems of aviation, Diesel and automobile engines. It is the cause of loss of valuable constituents from the cooling systems and the failure to fulfill essential function, namely, the cooling of the engine. Moreover, one of the causes of this foaming seems to be the vaporization of some of the low boiling constituents of the anti-freeze compositions in the areas of localized high temperature of the surface to be cooled, forming vapor bubbles. Whatever may be the cause, however, it has been found that the metallo-organic compounds disclosed in application Serial No. 513,477 are effective in repressing the foaming tendencies of anti-freeze compositions consisting largely of aqueous alcoholic solutions.

In commercial anti-freeze solutions, the lower boiling water soluble aliphatic alcohols, and polyhydric alcohols, the glycols and glycerols, are the freezing point depressant materials admixed with water. These alcohols loosen and detach from the walls of the confining vessels such materials as iron rust which with water alone remain attached. This material, especially in forced circulation systems, collects in the pipes and finally clogs the system. Furthermore, an alcohol solution has a lower surface tension than that of water and as a result the solutions pass through any soldered portions and minute crevices through which water alone does not usually seep. It is therefore desirable to prevent corrosion of the metal and also, if possible, to coat the equipment with a water-insoluble, water-repellant material which will prevent the aqueous solution from penetrating into cracks and crevices and escaping or leaking out of the system.

It is an object, therefore, of this invention to prepare aqueous or alcoholic heat exchange media, especially for internal combustion engine radiators, jacketed kettles, autoclaves, heat exchange tubes and refrigerator coils which have a highly desirable temperature range of liquid condition involving high heat capacities and low viscosity characteristics coupled with chemical inertness and physical properties which render the compositions substantially non-corrosive to the metallic and non-metallic parts of the confining equipment and also are substantially non-foaming under partially or totally vaporizing conditions, and show little tendency to creep under service conditions. Other objects of the invention will be apparent from reading the following description.

The composition of the invention has, in addition to the usual constituents of heat exchange media suitable for use at low temperatures, one or more of the metallo-organic compounds disclosed in the parent application Serial No. 513,477. It has been found that small quantities of these metallo-organic compounds in the compositions are particularly effective in reducing foaming of the desired aqueous or alcohol-containing fluids. The effects appear to be common to all the metallo-organic compounds and analogous metalloid-containing organic compounds, more particularly to the "silicone oils" in which the integer in the general formula of the silicon compounds is from 5 to 20.

The non-foaming compositions within the scope of the invention comprise a water-soluble alcohol having up to 5 carbon atoms in the molecule, such as ethanol or other monohydric alcohol, a glycol, especially a 1,2-glycol, glycerol or a mixture thereof, water, and one or more of the metallo-organic compounds disclosed in the parent application. Usually, however, in addition to these ingredients there are present a corrosion inhibitor such as an organic amine or an organic nitrite, suitable alkalizing and buffer compounds, and a sealing agent such as paper pulp or linseed meal; according to the service for which the composition is adapted.

In preparing compositions according to the invention, a concentrated composition is first prepared and then, by diluting the concentrate with water in various amounts, the hydraulic media of various freezing points are prepared. The composition of a basic concentrate may be exemplified by the following:

Example I

| | Per cent |
|---|---|
| Mixture of ethylene and propylene glycols (specific gravity 1.0775) | 97.5 |
| Water | 2.5 |

To which is added:

| | G./gallon |
|---|---|
| Sodium nitrite | 4 |
| Sodium carbonate | 12 |
| Disodium phosphate | 4 |
| Linseed meal | 5 |
| Calcozine Red BX dye | 0.08 |

Example II

| Alcohol concentrate: | Per cent |
|---|---|
| Methyl alcohol | 66 |
| Isopropyl alcohol | 33 |
| Water | 1 |

To which is added:

Light lubricating oil 76 cc./gal. of alcohol concentrate (32 seconds Saybolt vis. at 100° F.)

| Natural Alphazurine 2G-dye | g./gallon | 0.04 |
|---|---|---|
| Sodium nitrite | do | 4 |
| Sodium carbonate | do | 12 |
| Disodium phosphate | do | 4 |
| Linseed meal | do | 5 |

The metallo-organic compounds are incorporated in such concentrates in an amount between 0.000001% and 1.0%. The resultant blended compositions are then diluted with various quantities of water. Thus, 15% aqueous composition, Example I, had a freezing point of 20° F.; 27.5% solution, a freezing point of 10° F.; and 35% solution, a freezing point of 0° F. For Example II for protection to a temperature of 20° F., a 15% aqueous solution is prepared, and for temperatures of about 0° F., a 30% aqueous solution is prepared.

In the preparation of concentrated composition of Example I, the mixture of ethylene and propylene glycols may vary in the ranges from 90% to 10% ethylene glycol and from 10% to 90% propylene glycol. Instead of a mixture of these glycols, a mixture of any of the several 1-2 glycols containing up to about 5 carbon atoms may also be employed. Glycerol may also be used. The advantages of employing the glycols and glycerol are that in addition to their water solubilities and low freezing and high boiling points, the compositions at low temperatures form slurries or highly viscous masses previous to solidification and the pressure exerted upon complete solidification is insufficient to cause cracking or breaking of the metallic walls of the confining equipment. The glycols are preferable to glycerol in the preparation of anti-freeze solutions for automobiles because glycerol in contact with piston valves and other engine parts into which the solution may come into contact in service due to leakage through gaskets produces a sticky or resinous material necessitating in many cases costly repairs. The amounts in which the glycols and glycerol are used are roughly those given for the mixture of the glycols in the above specific example.

The lower monohydric alcohols are at the present time often used. These alcohols are generally employed as mixtures such as methyl and isopropyl alcohols as shown in Example II, and sometimes as a mixture of ethyl and isopropyl alcohols. In the concentrates of the type of Example II, the mixtures of methyl and isopropyl alcohols may vary from 90% to 10% methyl alcohol, and from 10% to 90% of isopropyl alcohols in order to prepare mixtures of specific gravity of about 0.81.

The amount of water in the concentrated compositions is roughly that given in the specific example, although varying quantities of water may be employed in the heat exchange equipment or radiator, depending upon freezing or boiling point desired.

Instead of sodium nitrite as corrosion inhibitor, other inorganic nitrites may be used, especially potassium and calcium nitrites. Organic amines, metal soaps and petroleum sulfonates are advantageous corrosion inhibitors in many cases. In an automobile radiator many metals occur in contact with each other. Electrolytic effects play a considerable part in the corrosion of automobile radiators. For this reason it has been found advisable in many cases to employ a mixture of corrosion inhibitors rather than any one individually. Organic amines which have been found especially advantageous are cyclohexylamine and dicyclohexylamine. The amounts in which the various corrosion inhibitors are used depend greatly on service to which the heat exchange media are to be adapted, but in general the amounts are about that given for sodium nitrite in the specific example.

The sodium carbonate and disodium phosphate given in the specific concentrated compositions are examples of a buffer combination for a pH range of between 10 and 11.5. Other buffer combinations functioning over this pH range which are soluble in the final compositions and which do not react with the other constituents to form electrolytes having undesirable corrosive tendencies may be employed.

A disadvantage of using alcohol compounds in the preparation of anti-freeze solutions is their characteristic of imparting to the composition a lower surface tension than water and thus causing increased creepage effects. This activity is usually counteracted in the compositions of the invention by the addition to the mixture of compounds of the type of linseed meal which tend to seal or plug crevices, thus preventing leakage. Other compounds which may be used to reduce this form of leakage are gum gambier, tragacanth, quince seed, Irish moss and their mixtures. Other well dispersed solids may be included such as paper pulp, aluminum bronze, etc. The metallo-organic compounds herein disclosed are not only insoluble in water but also repel water, and are also insoluble in aqueous alcoholic solutions. Further, in view of their low surface tension, they spread in very thin films on the surface of water solutions and tend to be absorbed on metals. Thus, as pointed out in the parent case, the metallo-organic compounds form thin coatings on metallic surfaces. This feature is particularly advantageous in regard to cracks and crevices in metallic surfaces since, because of their ability not to be wetted by aqueous solutions and to repel aqueous solutions, the presence of the metallo-organic compounds on the surfaces, especially in the cracks, prevents leakage of the constituents from the radiator or other containing heat exchange vessel.

It has been found that the metallo-organic compounds and analogous metalloid-containing organic compounds, particularly effective in heat exchange media, and especially anti-freeze compositions, are the silicone compounds of 25 to 3,000 centistokes at 100° F. and in which $n$ in the following general formula:

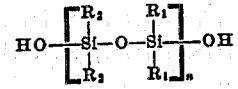

is between 6 and 20, and $R_1$ is an aliphatic hydrocarbon radical and $R_2$ is an aromatic radical.

The compositions of this invention were investigated for foaming characteristics by heating and shaking solutions so as to produce an appreciable amount of foam. In this manner it was found that aqueous solutions of mixtures of (1) methyl and isopropyl alcohols, (2) ethylene and proylene glycols, and (3) glycerine, showed negligible foam formation in the presence of silicone compounds. As a specific illustration of a composition employed as an anti-freeze solution, the following compositions were prepared:

Blend A

| | |
|---|---|
| Ethyl alcohol | per cent vol__83.64 |
| Isopropyl alcohol (91%) | do____14.64 |
| Light lubricating oil (32 seconds Saybolt Vis. at 100° F.) | per cent vol__ .98 |
| Soluble oil | do____ .74 |
| Powdered castile soap | gm./liter__ 1.4 |

Blend B

| | |
|---|---|
| Ethyl alcohol | per cent vol__ 83.54 |
| Isopropyl alcohol (91%) | do____ 14.54 |
| Light lubricating oil (32 seconds Saybolt Vis. at 100° F.) | per cent vol__ .98 |
| Soluble oil | do____ .74 |
| Powdered castile soap | gm./liter__ 1.4 |
| Silicone oil | per cent vol__ .20 |

The following data were obtained:

| | Time for Foam to Break |
|---|---|
| Blend A | Over 5 minutes |
| Blend B | 1 minute |

This comparison of data indicates that the silicone oil compounds reduce the amount of foam produced and that the foam produced in the presence of these compounds breaks more easily, and is of a finer texture and less obstructive in character than that produced in the absence of the silicone compounds.

The heat exchange media prepared by diluting the concentrated compositions are liquid over a wide temperature range and when cooled to temperatures at which solidification commences highly viscous or semi-solid masses are obtained rather than immediately solid masses. In the various stages of dilution the compositions are non-corrosive and little or no material is deposited on to the surfaces of the confining vessels. Thus, with the negligible corrosion and the maintenance of clean heat transfer surfaces, the efficiency of the cooling system is maintained at a high standard by use of the compositions of the present invention.

It will be apparent to those skilled in the art that numerous modifications can be made in the compositions previously disclosed. These modifications are not excluded from within the scope of the present invention. It it intended to include all such modifications within the scope of the present invention and to be limited only by the appended claims.

What is claimed is:

1. An aqueous composition suitable for use in heat exchange and pressure transmitting systems consisting essentially of a mixture of a lower boiling water-soluble aliphatic alcohol and water as the main constituents and in minor proportions a water in soluble liquid compound having the general formula

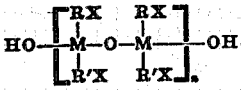

wherein R is a hydrocarbon radical selected from the group consisting of aliphatic, cyclo-aliphatic and aromatic hydrocarbon radicals, R' is a hydrocarbon radical selected from the group consisting of aliphatic, cyclo-aliphatic and aromatic hydrocarbon radicals; X is selected from the group consisting of hydrogen, chlorine, bromine, iodine and fluorine; M is an element selected from the group consisting of silicon, titanium, germanium, and zirconium and $n$ is an integer from 1 to 25.

2. A liquid composition suitable for use in heat exchange and pressure transmitting systems consisting essentially of a mixture of a water-soluble aliphatic alcohol and water as the main constituents and in minor proportions a water-insoluble liquid compound having the general formula

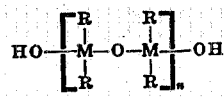

wherein R is a hydrocarbon radical, M is an element selected from the group consisting of silicon, titanium, germanium and zirconium, and $n$ is an integer from 1 to 25.

3. A liquid composition according to claim 2 in which the water-soluble alcohol is a polyhydric alcohol having up to five carbon atoms in the molecule.

4. A liquid composition according to claim 2 in which the water-soluble alcohol is a monohydric alcohol having up to five carbon atoms in the molecule.

5. A liquid composition according to claim 2 in which the water-soluble alcohol is a dihydric alcohol having up to five carbon atoms in the molecule.

6. A liquid composition according to claim 2 in which the water-soluble alcohol is a trihydric alcohol having up to five carbon atoms in the molecule.

7. A liquid composition suitable for use in heat exchange and pressure transmitting systems consisting essentially of a mixture of a 1-2 glycol having up to about five carbon atoms in the molecule and water as the main constituents and from .000001 to 1.0% by weight of a water-insoluble liquid compound having the general formula

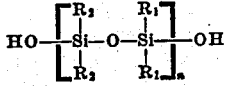

where $R_1$ is an aliphatic hydrocarbon radical, $R_2$ is an aromatic hydrocarbon radical, and $n$ is an integer from 6 to 20.

8. A liquid composition suitable for use in heat exchange and pressure transmitting systems consisting essentially of a mixture of a 1-2 glycol having up to about five carbon atoms in the molecule and water as the main constituents to which are added as minor constituents a buffer-salt to maintain in the composition an alkalinity of pH between 10 and 11.5 and a water-insoluble liquid compound having the general formula

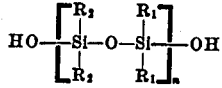

wherein $R_1$ is an aliphatic hydrocarbon radical, $R_2$ is an aromatic hydrocarbon radical, and $n$ is an integer from 6 to 20.

9. A liquid composition according to claim 8 in which the 1-2 glycol is a mixture of ethylene and 1-2 propylene glycols.

10. A liquid composition according to claim 8 in which the buffer-salt is a mixture of sodium carbonate and disodium phosphate.

11. An anti-freeze solution suitable for use at low atmospheric winter temperatures in automobile engine cooling systems consisting essentially of a mixture of specific gravity of about 1.0775 of ethylene and propylene glycols and water as main constituents, to which are added a corrosion inhibitor of the class consisting of sodium nitrite and cyclohexylamine, sodium carbonate and disodium phosphate in amounts to exert buffer action for the pH range of from 10 to 11.5 and 0.000001% to 1.0% of a water-insoluble liquid compound of general formula

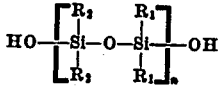

wherein $R_1$ s an aliphatic hydrocarbon radical, $R_2$ is an aromatic hydrocarbon radical, and $n$ is an integer from 6 to 20.

12. A liquid composition suitable for use in heat exchange and pressure transmitting systems which consists essentially of an alkaline solution of pH from 10 to 11.5 of a water soluble polyhydric aliphatic alcohol, water and a silicone compound dontaining hydroxyl groups bonded to its terminal silicon constituents.

13. An anti-freeze solution suitable for use at low atmospheric winter temperatures in automobile cooling systems which consists essentially of a mixture of a water soluble polyhydric aliphatic alcohol and water as main constituents and in minor proportions a corrosion inhibitor and a silicone oil compound containing hydroxyl groups bonded to its terminal silicon constituents.

JOHN C. ZIMMER.

REFERENCES CITED

The following references are of record in the file of this patent:

UNITED STATES PATENTS

| Number | Name | Date |
|---|---|---|
| 1,213,368 | Hibbert | Jan. 23, 1917 |
| 1,988,584 | Dana et al. | Jan. 22, 1935 |
| 2,071,482 | Winning et al. | Feb. 23, 1937 |
| 2,233,185 | Smith | Feb. 25, 1941 |
| 2,258,222 | Rochow | Oct. 7, 1941 |
| 2,375,007 | Larsen | May 1, 1943 |
| 2,349,338 | Capsadle | May 23, 1944 |
| 2,384,384 | McGregor et al. | Sept. 4, 1945 |

OTHER REFERENCES

Fulton, "Hydraulic Brake Fluids," in Ind. Eng. Chem., vol. 30, No. 4, pages 422 and 427.

Bass et al., "Silicones—High Polymeric Substances," publication by Dow Corning Corp., Midland, Mich. Reprinted from Nov., 1944 issue Modern Plastics Magazine.

Kauppi et al., "Organo-Silicon Compounds for Insulating Electric Machines," manuscript submitted Nov. 24, 1944, at the American Institute of Electrical Engineers (N. Y. C., N. Y).